(12) United States Patent
Iwaguchi et al.

(10) Patent No.: US 11,073,655 B2
(45) Date of Patent: Jul. 27, 2021

(54) OPTICAL FIBER AND ULTRAVIOLET RAY CURABLE RESIN COMPOSITION

(71) Applicant: SUMITOMO ELECTRIC INDUSTRIES, LTD., Osaka (JP)

(72) Inventors: Noriaki Iwaguchi, Osaka (JP); Tatsuya Konishi, Osaka (JP); Takashi Fujii, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/583,365

(22) Filed: Sep. 26, 2019

(65) Prior Publication Data

US 2020/0103588 A1 Apr. 2, 2020

(30) Foreign Application Priority Data

Sep. 27, 2018 (JP) .............................. JP2018-182360

(51) Int. Cl.
*G02B 6/02* (2006.01)

(52) U.S. Cl.
CPC ............................. *G02B 6/02395* (2013.01)

(58) Field of Classification Search
CPC ................................................. G02B 6/02395
See application file for complete search history.

(56) References Cited

U.S. PATENT DOCUMENTS

| | | | | |
|---|---|---|---|---|
| 4,540,597 A * | 9/1985 | Nagasaki | ......... | B29D 11/00663 427/501 |
| 4,575,437 A * | 3/1986 | Kojima | ............ | B29D 11/00663 264/1.27 |
| 5,459,175 A * | 10/1995 | Woods | ....................... | C08F 6/02 522/180 |
| 6,316,516 B1 * | 11/2001 | Chien | .................... | C03C 25/106 427/515 |
| 6,326,406 B1 * | 12/2001 | De Tommaso | ......... | A61P 23/02 514/731 |
| 6,376,571 B1 * | 4/2002 | Chawla | .................. | C03C 25/106 522/64 |
| 6,489,376 B1 * | 12/2002 | Khudyakov | ........ | C08F 283/006 522/120 |
| 6,683,151 B1 * | 1/2004 | Loontjens | .......... | C08G 18/3851 106/18.32 |
| 6,887,918 B2 * | 5/2005 | Khudyakov | ........ | C08F 283/006 385/147 |

(Continued)

FOREIGN PATENT DOCUMENTS

| | | |
|---|---|---|
| JP | 2006-249265 A | 9/2006 |
| JP | 2012-136401 A | 7/2012 |

OTHER PUBLICATIONS

O'Brien et al., Impact of Oxygen on Photopolymerization Kinetics and Polymer Structure, Macromolecules 2006, 39, 2501-2506 (Year: 2006).*

*Primary Examiner* — Peter Radkowski
(74) *Attorney, Agent, or Firm* — Faegre Drinker Biddle & Reath LLP

(57) ABSTRACT

An optical fiber includes a glass fiber that includes a core and a cladding and a coating resin layer that coats the glass fiber by being in contact with the glass fiber. The coating resin layer includes a cured material of an ultraviolet ray curable resin composition having a dissolved oxygen concentration of greater than or equal to 8.5 mg/L.

4 Claims, 2 Drawing Sheets

(56) References Cited

U.S. PATENT DOCUMENTS

| | | | | |
|---|---|---|---|---|
| 7,085,466 B2* | 8/2006 | Roba | .................... | C03C 25/1065 385/128 |
| 7,200,310 B2* | 4/2007 | Roba | .................... | C03C 25/1065 385/126 |
| 7,317,858 B2* | 1/2008 | Roba | .................... | C03C 25/106 385/126 |
| 8,426,021 B2* | 4/2013 | Cattron | ............... | C03C 25/1065 428/392 |
| 8,734,945 B2* | 5/2014 | Cattron | ............... | C09D 175/16 428/392 |
| 8,781,282 B2* | 7/2014 | Terruzzi | ............. | G02B 6/02395 385/128 |
| 2002/0107291 A1* | 8/2002 | De Tommaso | ........ | A61K 31/05 514/731 |
| 2003/0045599 A1* | 3/2003 | Khudyakov | .......... | C08F 283/02 522/96 |
| 2005/0207715 A1* | 9/2005 | Roba | .................... | C03C 25/1065 385/128 |
| 2005/0226582 A1* | 10/2005 | Nagelvoort | .............. | G02B 1/10 385/128 |
| 2006/0072889 A1* | 4/2006 | Roba | ....................... | C08L 75/04 385/128 |
| 2006/0228083 A1* | 10/2006 | Roba | .................. | G02B 6/02395 385/128 |
| 2009/0080851 A1* | 3/2009 | Nagelvoort | ........... | C08F 290/06 385/144 |
| 2012/0321265 A1* | 12/2012 | Terruzzi | ............. | C03C 25/1065 385/128 |
| 2014/0163132 A1* | 6/2014 | Nagelvoort | ......... | C03C 25/1065 522/173 |
| 2016/0177092 A1* | 6/2016 | McCarthy | .......... | C08G 18/8175 |
| 2018/0163075 A1* | 6/2018 | Ren | ......................... | C08L 75/14 |

\* cited by examiner

OPTICAL FIBER AND ULTRAVIOLET RAY CURABLE RESIN COMPOSITION

CROSS-REFERENCE TO RELATED APPLICATION

The present application is based upon and claims the benefit of the priority from Japanese patent application No. 2018-182360, filed on Sep. 27, 2018, which is hereby incorporated by reference in its entirety.

TECHNICAL FIELD

The present disclosure relates to an optical fiber and an ultraviolet ray curable resin composition.

BACKGROUND

JP2012-136401A discloses a resin coat optical fiber provided with a glass optical fiber including a core and a cladding, and a coating resin layer coating the glass optical fiber. The coating resin layer includes a primary layer and a secondary layer formed of an ultraviolet ray curable resin. The primary layer includes two layers of an inner layer and an outer layer. In the resin coat optical fiber, the fracturing of the glass optical fiber is suppressed by increasing a Young's modulus of the inner layer.

JP2006-249265A discloses a liquid curable resin composition for coating an optical fiber. In a case where a coating film is formed on a glass fiber by this resin composition, it is possible to improve the strength of the glass fiber itself.

SUMMARY

An optical fiber according to one aspect of the present disclosure includes: a glass fiber that includes a core and a cladding; and a coating resin layer that coats the glass fiber by being in contact with the glass fiber, in which the coating resin layer includes a cured material of an ultraviolet ray curable resin composition having a dissolved oxygen concentration of greater than or equal to 8.5 mg/L.

An ultraviolet ray curable resin composition according to one aspect of the present disclosure is an ultraviolet ray curable resin composition used for forming a coating resin layer that coats a glass fiber including a core and a cladding by being in contact with the glass fiber, in which a dissolved oxygen concentration is greater than or equal to 8.5 mg/L.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Figure 1:
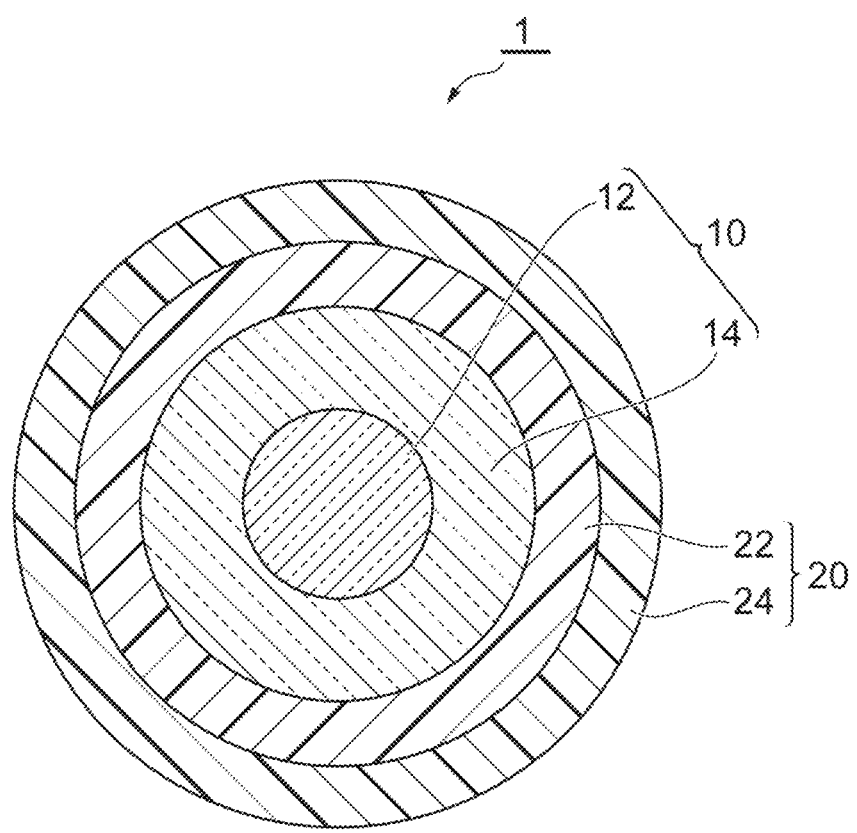
FIG. 1 is a sectional view illustrating a configuration of an optical fiber according to one embodiment.

Problem to be Solved by the Present Disclosure

As described above, in the case of using a specific resin composition, a manufacturing step tends to be complicated. Therefore, an object of the present disclosure is to provide an optical fiber and an ultraviolet ray curable resin composition that are capable of improving a strength of the optical fiber without using a specific resin composition.

Advantageous Effect of the Present Disclosure

According to the present disclosure, it is possible to provide an optical fiber and an ultraviolet ray curable resin composition that are capable of improving a strength of the optical fiber without using a specific resin composition.

DESCRIPTION OF EMBODIMENTS OF THE PRESENT DISCLOSURE

First, embodiments of the present disclosure will be listed and described. An optical fiber according to one aspect of the present disclosure, includes: a glass fiber that includes a core and a cladding; and a coating resin layer that coats the glass fiber by being in contact with the glass fiber, in which the coating resin layer includes a cured material of an ultraviolet ray curable resin composition having a dissolved oxygen concentration of greater than or equal to 8.5 mg/L.

In the optical fiber according to the embodiment described above, the coating resin layer includes the cured material of the ultraviolet ray curable resin composition having the dissolved oxygen concentration of greater than or equal to 8.5 mg/L. According to the studies of the present inventors, it is known that the strength of the optical fiber can be improved by including such a coating resin layer. Therefore, according to the optical fiber according to the embodiment described above, it is possible to improve the strength without using a specific resin composition.

In one embodiment, the dissolved oxygen concentration may be greater than or equal to 8.5 mg/L and less than or equal to 35 mg/L. In this case, it is possible to reliably improve the strength.

In one embodiment, the dissolved oxygen concentration may be greater than or equal to 8.5 mg/L and less than or equal to 25 mg/L. In this case, it is possible to suppress a decrease in a curing degree of the coating resin layer.

In one embodiment, the coating resin layer may include a primary resin layer that coats the glass fiber by being in contact with the glass fiber, and a secondary resin layer that coats the primary resin layer by being in contact with the primary resin layer, and at least one of the primary resin layer and the secondary resin layer may include a cured material of an ultraviolet ray curable resin composition having a dissolved oxygen concentration of greater than or equal to 8.5 mg/L.

An ultraviolet ray curable resin composition according to one embodiment of the present disclosure is an ultraviolet ray curable resin composition used for forming a coating resin layer that coats a glass fiber including a core and a cladding by being in contact with the glass fiber, in which a dissolved oxygen concentration is greater than or equal to 8.5 mg/L.

DETAILED DESCRIPTION OF THE EMBODIMENTS OF THE PRESENT DISCLOSURE

Hereinafter, specific examples of a method for manufacturing an optical fiber according to an embodiment of the present disclosure will be described in detail with reference to the drawings. The present invention is not limited to such examples, but is represented by the claims, and includes meanings equivalent to the claims and all changes within the claims. In the following description, the same reference numerals will be applied to the same constituents in the description of the drawings, and the repeated description will be omitted.

(Optical Fiber)

FIG. 1 is a sectional view illustrating a configuration of an optical fiber according to one embodiment. In FIG. 1, a sectional surface that is perpendicular to a central axis direction of an optical fiber 1 (an optical axis direction) is illustrated. As illustrated in FIG. 1, the optical fiber 1 of this embodiment includes a glass fiber 10 that is an optical transmission medium, and a coating resin layer 20 that coats the glass fiber 10.

The glass fiber 10 includes a core 12, and a cladding 14 that covers the core 12. The glass fiber 10 is a glass member, and for example, is formed of silica ($SiO_2$) glass. The glass fiber 10 transmits light that is introduced into the optical fiber 1. The core 12, for example, is provided in a region including a central axis line of the glass fiber 10. The core 12, for example, is formed of pure $SiO_2$ glass, or is formed by containing $GeO_2$ and/or a fluorine element, or the like in $SiO_2$ glass. The cladding 14 is provided in a region that surrounds the core 12. The cladding 14 has a refractive index that is lower than a refractive index of the core 12. The cladding 14, for example, is formed of pure $SiO_2$ glass, or $SiO_2$ glass to which a fluorine element is added.

The coating resin layer 20 is an ultraviolet ray curable resin layer that coats the cladding 14. The coating resin layer 20 includes a primary resin layer 22 that coats an outer circumference of the glass fiber 10, and a secondary resin layer 24 that coats an outer circumference of the primary resin layer 22. The primary resin layer 22 is in contact with an outer circumferential surface of the cladding 14, and coats the entire cladding 14. The secondary resin layer 24 is in contact with an outer circumferential surface of the primary resin layer 22, and coats the entire primary resin layer 22. The thickness of the primary resin layer 22, for example, is greater than or equal to 10 μm and less than or equal to 50 μm. The thickness of the secondary resin layer 24, for example, is greater than or equal to 10 μm and less than or equal to 40 μm. The coating resin layer 20 may further include a colored resin layer that coats the outer circumference of the secondary resin layer 24.

The primary resin layer 22 and the secondary resin layer 24, for example, are formed by curing an ultraviolet ray curable resin composition containing an oligomer, a monomer, and a photopolymerization initiator (a reaction initiator).

Urethane (meth)acrylate, epoxy (meth)acrylate, or a mixture thereof can be used as the oligomer. A reactant that is obtained by a reaction in a polyol compound, a polyisocyanate compound, and a hydroxyl group-containing (meth) acrylate compound can be used as the urethane (meth)acrylate.

Polytetramethylene glycol, polypropylene glycol, bisphenol A.ethylene oxide-added diol, and the like can be used as the polyol compound. 2,4-Tolylene diisocyanate, 2,6-tolylene diisocyanate, isophorone diisocyanate, and the like can be used as the polyisocyanate compound. 2-Hydroxy ethyl (meth)acrylate, 2-hydroxy butyl (meth)acrylate, 1,6-hexanediol mono(meth)acrylate, pentaerythritol tri(meth) acrylate, 2-hydroxy propyl (meth)acrylate, tripropylene glycol di(meth)acrylate, and the like can be used as the hydroxyl group-containing (meth)acrylate compound.

A monofunctional monomer having one polymerizable group and a polyfunctional monomer having two or more polymerizable groups can be used as the monomer. Two or more types of such monomers may be used by being mixed.

Examples of the monofunctional monomer include a (meth)acrylate-based monomer such as methyl (meth)acrylate, ethyl (meth)acrylate, propyl (meth)acrylate, n-butyl (meth)acrylate, s-butyl (meth)acrylate, tert-butyl (meth) acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethyl hexyl (meth)acrylate, n-octyl (meth)acrylate, isooctyl (meth)acrylate, isodecyl (meth)acrylate, lauryl (meth)acrylate, phenoxy ethyl (meth)acrylate, tetrahydrofurfuryl (meth)acrylate, benzyl (meth)acrylate, dicyclopentenyl (meth)acrylate, dicyclopentenyl oxyethyl (meth)acrylate, dicyclopentanyl (meth) acrylate, nonyl phenol polyethylene glycol (meth)acrylate, nonyl phenoxy polyethylene glycol (meth)acrylate, and isobornyl (meth)acrylate; a carboxyl group-containing monomer such as a (meth)acrylic acid, a (meth)acrylic acid dimer, carboxy ethyl (meth)acrylate, carboxy pentyl (meth) acrylate, and ω-carboxy-polycaprolactone (meth)acrylate; heterocyclic ring-containing (meth)acrylate such as 3-(3-pyridyl)propyl (meth)acrylate, N-acryloyl morpholine, N-vinyl pyrrolidone, N-vinyl caprolactam, N-acryloyl piperidine, N-methacryloyl piperidine, and N-acryloyl pyrrolidine; a maleimide-based monomer such as maleimide, N-cyclohexyl maleimide, and N-phenyl maleimide; an N-substituted amide-based monomer such as (meth)acrylamide, N,N-dimethyl (meth)acrylamide, N,N-diethyl (meth) acrylamide, N-hexyl (meth)acrylamide, N-methyl (meth) acrylamide, N-butyl (meth)acrylamide, N-butyl (meth) acrylamide, N-methylol (meth)acrylamide, and N-methylol propane (meth)acrylamide; an aminoalkyl(meth)acrylate-based monomer such as aminoethyl(meth)acrylate, aminoethyl(meth)acrylate, N,N-dimethyl aminoethyl(meth)acrylate, and t-butyl aminoethyl (meth)acrylate; and a succinimide-based monomer such as N-(meth)acryloyl oxymethylene succinimide, N-(meth)acryloyl-6-oxyhexamethylene succinimide, and N-(meth)acryloyl-8-oxyoctamethylene succinimide.

Examples of the polyfunctional monomer include such ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of an alkylene oxide adduct of bisphenol A, tetraethylene glycol di(meth)acrylate, hydroxy pivalate neopentyl glycol di(meth)acrylate, 1,4-butanediol di(meth)acrylate, 1,6-hexanediol di(meth) acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyl diol di(meth) acrylate, 3-ethyl-1,8-octanediol di(meth)acrylate, EO adduct di(meth)acrylate of bisphenol A, trimethylol propane tri (meth)acrylate, trimethylol octane tri(meth)acrylate, trimethylol propane polyethoxy tri(meth)acrylate, trimethylol propane polypropoxy tri(meth)acrylate, trimethylol propane polyethoxy polypropoxy tri(meth)acrylate, tris[(meth)acryloyl oxyethyl]isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylol propane tetra(meth)acrylate, dipentaerythritol tetra(meth)acrylate, dipentaerythritol penta(meth)acrylate, dipentaerythritol hexa(meth)acrylate, and caprolactone modified tris[(meth)acryloyl oxyethyl]isocyanurate.

The photopolymerization initiator can be used by being suitably selected from known radical photopolymerization initiators. Examples of the photopolymerization initiator include 1-hydroxy cyclohexyl phenyl ketone, 2,2-dimethoxy-2-phenyl acetophenone, 1-(4-isopropyl phenyl)-2-hydroxy-2-methyl propan-1-one, bis(2,6-dimethoxy benzoyl)-2,4,4-trimethyl pentyl phosphine oxide, 2-methyl-1-[4-(methyl thio)phenyl]-2-morpholino-propan-1-one (Irgacure 907, manufactured by BASF SE), 2,4,6-trimethyl benzoyl diphenyl phosphine oxide (Irgacure TPO, manufactured by BASF SE), and bis(2,4,6-trimethyl benzoyl)phenyl phosphine oxide (Irgacure 819, manufactured by BASF SE). Two or more types of such photopolymerization initiators may be used by being mixed, and it is preferable that the photopolymerization initiator contains at least 2,4,6-trimethyl benzoyl diphenyl phosphine oxide.

(Method for Manufacturing Optical Fiber)

Figure 2:
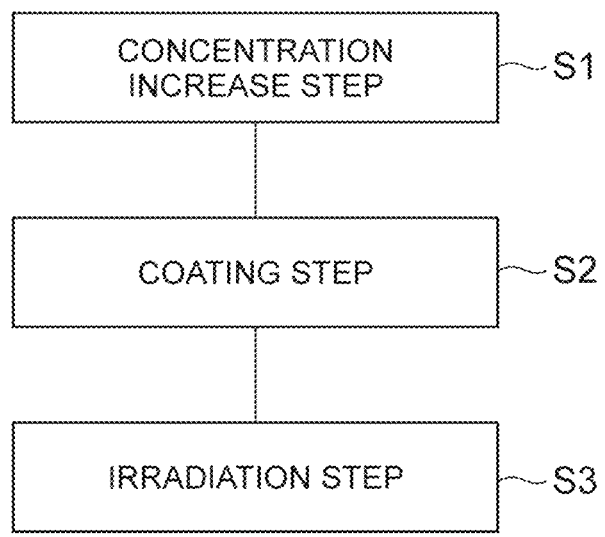
FIG. 2 is a flowchart illustrating a method for manufacturing an optical fiber according to one embodiment.

FIG. 2 is a flowchart illustrating a method for manufacturing an optical fiber according to one embodiment. As illustrated in FIG. 2, a method for manufacturing the optical fiber 1 according to this embodiment includes a concentration increase step S1, a coating step S2, and an irradiation step S3.

First, in the concentration increase step S1, the dissolved oxygen concentration in the ultraviolet ray curable resin composition that is used for forming the coating resin layer 20 is increased. Specifically, at least one of a dissolved oxygen concentration in a first ultraviolet ray curable resin composition that is used for forming the primary resin layer 22 and a dissolved oxygen concentration in a second ultraviolet ray curable resin composition for forming the secondary resin layer 24 is increased. Examples of a method of increasing the dissolved oxygen concentration include a method of pressurizing a resin composition (a resin liquid) that is a target with air or high-concentration oxygen gas, and a bubbling method of injecting air or high-concentration oxygen gas into the resin composition. In the bubbling method, in a case of heating the resin composition, air bubbles are easily formed (subjected to bubbling) in the resin composition. However, in a case where the temperature of the resin composition increases, an oxygen solubility decreases, and thus, for example, the bubbling method may be performed at a room temperature (20° C. to 30° C.) without heating the resin composition.

In the concentration increase step S1, the dissolved oxygen concentration in the ultraviolet ray curable resin composition that is used for forming the coating resin layer 20 is greater than or equal to 8.5 mg/L and less than or equal to 35 mg/L. Specifically, at least one of the dissolved oxygen concentration in the first ultraviolet ray curable resin composition and the dissolved oxygen concentration in the second ultraviolet ray curable resin composition is greater than or equal to 8.5 mg/L and less than or equal to 35 mg/L. The dissolved oxygen concentration is greater than or equal to 8.5 mg/L, is preferably greater than or equal to 8.7 mg/L, and is more preferably greater than or equal to 8.9 mg/L, and thus, it is possible to improve the strength of the optical fiber 1. In addition, the dissolved oxygen concentration is less than or equal to 35 mg/L, is preferably less than or equal to 25 mg/L, and is more preferably less than or equal to 22 mg/L, and thus, it is possible to suppress a decrease in the curing degree of the coating resin layer 20. In a case where the curing degree of the coating resin layer 20 decreases, the coating resin layer 20 may be peeled off or be ruptured at the time of winding the optical fiber 1.

In the coating step S2 subsequent to the concentration increase step S1, the ultraviolet ray curable resin composition in which the dissolved oxygen concentration is increased in the concentration increase step S1 is applied to the glass fiber 10. Specifically, the first ultraviolet ray curable resin composition in which the dissolved oxygen concentration is increased in the concentration increase step S1 is applied onto the surface of the glass fiber 10, and thus, a first layer (a layer corresponding to the primary resin layer 22 after being cured) including the first ultraviolet ray curable resin composition is formed. After that, the second ultraviolet ray curable resin composition in which the dissolved oxygen concentration is increased in the concentration increase step S1 is applied onto the surface of the first layer, and thus, a second layer (a layer corresponding to the secondary resin layer 24 after being cured) including the second ultraviolet ray curable resin composition is formed.

In the irradiation step S3 subsequent to the coating step S2, the first layer and the second layer that are applied onto the glass fiber 10 are irradiated with an ultraviolet ray, and thus, the first ultraviolet ray curable resin composition and the second ultraviolet ray curable resin composition are cured. Accordingly, the optical fiber 1 including the glass fiber 10, and the coating resin layer 20 including the primary resin layer 22 formed by curing the first layer and the secondary resin layer 24 formed by curing the second layer is obtained. It can be described that the coating resin layer 20 includes the cured material of the ultraviolet ray curable resin composition having the dissolved oxygen concentration of greater than or equal to 8.5 mg/L, and at least one of the primary resin layer 22 and the secondary resin layer 24 includes the cured material of the ultraviolet ray curable resin composition having the dissolved oxygen concentration of greater than or equal to 8.5 mg/L. For example, an ultraviolet ray LED and an ultraviolet ray lamp are used as an ultraviolet ray light source. A wavelength range of an ultraviolet ray, for example, is 290 nm to 390 nm (a UVA range and a UVB range). An illuminance of an ultraviolet ray, for example, is greater than or equal to 300 mW/cm$^2$ and less than or equal to 1000 mW/cm$^2$. An irradiation time of the ultraviolet ray, for example, is shorter than or equal to 1 second. The ultraviolet ray, for example, is emitted in an inert gas atmosphere such as a nitrogen atmosphere.

According to Steps S1 to S3 described above, the optical fiber 1 of which the strength is improved is obtained without using a specific resin composition.

EXAMPLES

Hereinafter, the present invention will be described in more detail by using examples, but the present invention is not limited to the examples described above.

Example 1

As the concentration increase step, a bubbling method was performed with respect to each of the first ultraviolet ray curable resin composition that is used for forming the primary resin layer and the second ultraviolet ray curable resin composition that is used for forming the secondary resin layer, at a room temperature. The first ultraviolet ray curable resin composition was prepared by mixing 70 parts by mass of a urethane acrylate oligomer as an oligomer, 27 parts by mass of EO modified nonyl phenol acrylate as a monomer, 2.0 parts by mass of 2,4,6-trimethyl benzoyl diphenyl phosphine oxide as a photopolymerization initiator, and 1.0 part by mass of 3-mercaptopropyl trimethoxy silane as a silane coupling agent. The second ultraviolet ray curable resin composition was prepared by mixing 50 parts by mass of urethane acrylate oligomer as an oligomer, 28 parts by mass of epoxy acrylate, 20 parts by mass of isobornyl acrylate as a monomer, and 2.0 parts by mass of 2,4,6-trimethyl benzoyl diphenyl phosphine oxide as a photopolymerization initiator.

A nozzle that was connected to air piping was inserted into a container in which each of the resin compositions was accumulated, and air was fed to each of the resin compositions in a room temperature (25° C.) environment. Accordingly, the dissolved oxygen concentration in each of the resin compositions was 9 mg/L. The dissolved oxygen concentration in each of the resin compositions was adjusted by a bubbling time. An oxygen concentration meter for an organic solvent was used for measuring the dissolved oxygen concentration. The oxygen concentration meter for an organic solvent was inserted into each of the resin compositions, and then, a value at the time of being stabilized was set to the dissolved oxygen concentration. The dissolved oxygen concentration after the bubbling was measured in a state where visible air bubbles were removed by performing stirring and defoaming.

Next, as the coating step, the first layer having a thickness of 32.5 μm was formed on the outer circumference of the glass fiber having a diameter of 125 m and including the core and the cladding, by using the first ultraviolet ray curable resin composition in which the dissolved oxygen concentration was increased. The second layer having a thickness of 27.5 m was formed on the outer circumference of the first layer by using the second ultraviolet ray curable resin composition in which the dissolved oxygen concentration was increased.

Next, as the irradiation step, the first layer and the second layer were cured by emitting an ultraviolet ray at an illuminance of 300 mW/cm² for an irradiation time of 0.1 seconds in a nitrogen atmosphere, and thus, the coating resin layer including the primary resin layer and the secondary resin layer was formed. The illuminance of the ultraviolet ray was measured by using an ultraviolet ray intensity meter (a measurement wavelength range of 290 nm to 390 nm (a UVA range and a UVB range)).

Example 2

The optical fiber was manufactured in the same condition as that of Example 1, except that the dissolved oxygen concentration in each of the resin compositions in the concentration increase step was set to 10 mg/L.

Example 3

The optical fiber was manufactured in the same condition as that of Example 1, except that the dissolved oxygen concentration in each of the resin compositions in the concentration increase step was set to 14 mg/L.

Example 4

The optical fiber was manufactured in the same condition as that of Example 1, except that the dissolved oxygen concentration in each of the resin compositions in the concentration increase step was set to 20 mg/L.

Example 5

The optical fiber was manufactured in the same condition as that of Example 1, except that the dissolved oxygen concentration in each of the resin compositions in the concentration increase step was set to 30 mg/L.

Comparative Example 1

The optical fiber was manufactured in the same condition as that of Example 1, except that the concentration increase step was not performed. The dissolved oxygen concentration in each of the resin compositions was 5 mg/L.

In the optical fibers of Examples 1 to 6 and Comparative Example 1, respective amounts of increase in a glass strength and respective amounts of decrease in a gel fraction were measured. The amount of increase in the glass strength was obtained as a difference in the glass strength between before and after the dissolved oxygen concentration increase step by measuring the respective glass strengths before and after the dissolved oxygen concentration increase step. The glass strength was measured by performing a tension test with respect to each of the optical fibers to be tested at a tension rate of 25 mm/minute, where the strength at which half of the optical fibers to be tested fracture is considered 50% strength. A gel fraction was calculated as a decrease rate in the weight of the optical fiber by immersing the optical fiber in methyl ethyl ketone (MEK) at 60° C. for 17 hours ((Weight of Optical Fiber before Immersion−Weight of Optical Fiber after Immersion)/Weight of Optical Fiber before Immersion×100). An amount of decrease in the gel fraction can be an index of an amount of decrease in the curing degree.

The dissolved oxygen concentrations, the amounts of increase in the glass strength, and the amounts of decrease in the gel fraction of Examples 1 to 6 and Comparative Examples 1 and 2 are shown in Table 1.

TABLE 1

|  | Example 1 | Example 2 | Example 3 | Example 4 | Example 5 | Comparative Example 1 |
|---|---|---|---|---|---|---|
| Dissolved oxygen concentration | 9 | 10 | 14 | 20 | 30 | 5 |
| Amount of increase in glass strength (kgf) | 0.2 | 0.2 | 0.2 | 0.3 | 0.6 | 0 |
| Amount of decrease in gel fraction (%) | 0 | 0 | 0 | 0 | 1 | 0 |

In Example 1, the glass strength increased by 0.2 kgf, and the gel fraction did not decrease. In Example 2, the glass strength increased by 0.2 kgf, and the gel fraction did not decrease. In Example 3, the glass strength increased by 0.2 kgf, and the gel fraction did not decrease. In Example 4, the glass strength increased by 0.3 kgf, and the gel fraction did not decrease. In Example 5, the glass strength increased by 0.6 kgf, and the gel fraction decreased by 1%. In Comparative Example 1, the glass strength did not increase, and the gel fraction did not decrease.

What is claimed is:

1. An optical fiber comprising:
a glass fiber that includes a core and a cladding; and a coating resin layer that coats the glass fiber by being in contact with the glass fiber, wherein the coating resin layer includes a cured material of an ultraviolet ray curable resin composition having a dissolved oxygen concentration of greater than or equal to 8.5 mg/L.

2. The optical fiber according to claim 1, wherein the dissolved oxygen concentration is greater than or equal to 8.5 mg/L and less than or equal to 35 mg/L.

3. The optical fiber according to claim 1, wherein the dissolved oxygen concentration is greater than or equal to 8.5 mg/L and less than or equal to 25 mg/L.

4. The optical fiber according to claim 1, wherein the coating resin layer includes a primary resin layer that coats the glass fiber by being in contact with the glass fiber, and a secondary resin layer that coats the primary resin layer by being in contact with the primary resin layer, and at least one of the primary resin layer and the secondary resin layer includes a cured material of an ultraviolet ray curable resin composition having a dissolved oxygen concentration of greater than or equal to 8.5 mg/L.

* * * * *